(12) United States Patent
Schmidt et al.

(10) Patent No.: US 8,324,586 B2
(45) Date of Patent: Dec. 4, 2012

(54) CONFIGURABLE MULTI RESOLUTION FLAT PANEL DETECTOR

(75) Inventors: Kay Schmidt, Dousman, WI (US); Paul Granfors, Sunnyvale, CA (US); Stephen Metz, Kenmore, WA (US)

(73) Assignee: General Electric Company, Schenectady, NY (US)

( * ) Notice: Subject to any disclaimer, the term of this patent is extended or adjusted under 35 U.S.C. 154(b) by 656 days.

(21) Appl. No.: 12/467,426

(22) Filed: May 18, 2009

(65) Prior Publication Data

US 2010/0288948 A1    Nov. 18, 2010

(51) Int. Cl.
*H01L 27/146* (2006.01)
(52) U.S. Cl. ............... 250/370.09; 250/370.01
(58) Field of Classification Search ............. 250/370.09, 250/370.01
See application file for complete search history.

(56) References Cited

U.S. PATENT DOCUMENTS

| | | | |
|---|---|---|---|
| 5,355,309 A | 10/1994 | Eberhard et al. | |
| 5,717,732 A | 2/1998 | Tam | |
| 5,822,392 A | 10/1998 | Hedengren | |
| 6,895,077 B2 * | 5/2005 | Karellas et al. | 378/98.3 |
| 7,479,640 B2 * | 1/2009 | Misawa | 250/370.09 |

* cited by examiner

*Primary Examiner* — Christine Sung
(74) *Attorney, Agent, or Firm* — Fletcher Yoder, P.C.

(57) ABSTRACT

A configurable flat panel multi resolution X-ray detector is disclosed herewith. The detector comprises: a detector array having a plurality of rows and columns of detector elements; scan electronics designed to activate the detector array for reading data from the detector array and readout electronics associated with the scan electronics to read the data from the detector elements. At least one of the detector array, scan electronics and readout electronics is configured to achieve multi resolution.

33 Claims, 8 Drawing Sheets

CONFIGURABLE MULTI RESOLUTION FLAT PANEL DETECTOR

FIELD OF THE INVENTION

This invention relates generally to digital detectors, and more particularly to, a multi resolution flat panel detector configured to have flexible resolution.

BACKGROUND OF THE INVENTION

Conventionally, flat panel detectors have uniform resolution. However there could be instances where a high-resolution image of an anatomy or part of the anatomy may be required. For instance, in some of the imaging applications, one part of the anatomy may need to be imaged at high resolution and for certain other parts lower resolution may suffice. For example, smaller features need to be imaged at high resolution to analyze them properly. Currently for various purposes, flat panel detectors with different resolutions are used. For example, to obtain a high-resolution image, a high-resolution flat panel detector is used.

Using multiple detectors is not a feasible method to obtain a multi resolution image.

Hence it will be beneficial to have a flat panel detector with a multi resolution capability to provide the optimum utility and image quality based on clinical need or resolution requirement.

SUMMARY OF THE INVENTION

The above-mentioned shortcomings, disadvantages and problems are addressed herein which will be understood by reading and understanding the following specification.

One embodiment of the present invention provides a multi resolution flat panel X-ray detector. The detector comprises: a detector array having a plurality of detector elements; scan electronics designed to activate the detector array for reading data from the detector array; and readout electronics associated with the scan electronics to read the data from the detector elements. At least one of the detector array, scan electronics and readout electronics is configured to achieve multi resolution.

In another embodiment, an X-ray imaging system is disclosed. The imaging system comprises: a multi resolution flat panel detector having at least one of a multi resolution detector array, scan electronics configured to achieve multi resolution, and readout electronics configured to achieve multi resolution; an energy source configured to apply radiation to a region of interest of an object; a data acquisition system for acquiring multi resolution image data from the detector; and a processor for generating a multi resolution image from the multi resolution image data. The processor is further programmed to configure at least one of the scan electronics and the readout electronics to obtain the multi resolution image.

In yet another embodiment, a method of providing a multi resolution single panel X-ray detector is disclosed. The method comprises: adjusting the resolution of the X-ray detector by performing at least one of the following steps: providing a detector array with a coarse resolution region and high resolution region; providing a detector array with a uniform resolution and a configurable scan electronics configured to simultaneously drive one or more scan lines in the detector array, based on the resolution requirement; and providing a detector array with a uniform resolution and a configurable readout electronics configured to combine data from data lines in the detector array based on the resolution requirement.

In yet another embodiment, a machine readable medium or media having recorded thereon instructions configured to instruct a flat panel detector including a computer or processor, memory, and a display, is disclosed. The medium comprises: a routine for configuring at least one of scan electronics and readout electronics in the flat panel detector iteratively for achieving a desired resolution.

Various other features, objects, and advantages of the invention will be made apparent to those skilled in the art from the accompanying drawings and detailed description thereof.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. Moreover, the terms "computer" and "processor" are used interchangeably herein to refer to either specialized hardware to perform digital signal processing, control, data manipulation, and/or calculations, or a general purpose computer that can be programmed to perform the same functions and/or adapted to interface with external digital signals. The phrases "computer or processor" and "processor or computer" are therefore intended to have equal scope with either of the individual terms and are not intended to imply a dichotomy between the two terms.

Technical effects of embodiments of the present invention include providing a multi resolution flat panel X-ray detector. The multi resolution is achieved by manufacture of at least one of detector array, scan electronics or readout electronics in the detector and/or by configuring at least one of scan electronics or readout electronics.

In an embodiment, multi resolution is achieved by having variable density detector element regions defining a high-resolution region and a coarse-resolution region.

In an embodiment, one or more scan lines are driven simultaneously, and data from data lines in the detector array are combined to convert a high-resolution detector to a low-resolution detector.

In an embodiment, the scan electronics and readout electronics are configured to achieve multi resolution.

Although the invention is explained with reference to flat panel X-ray detectors, the application of the method may be extended to various digital detectors.

Figure 1:
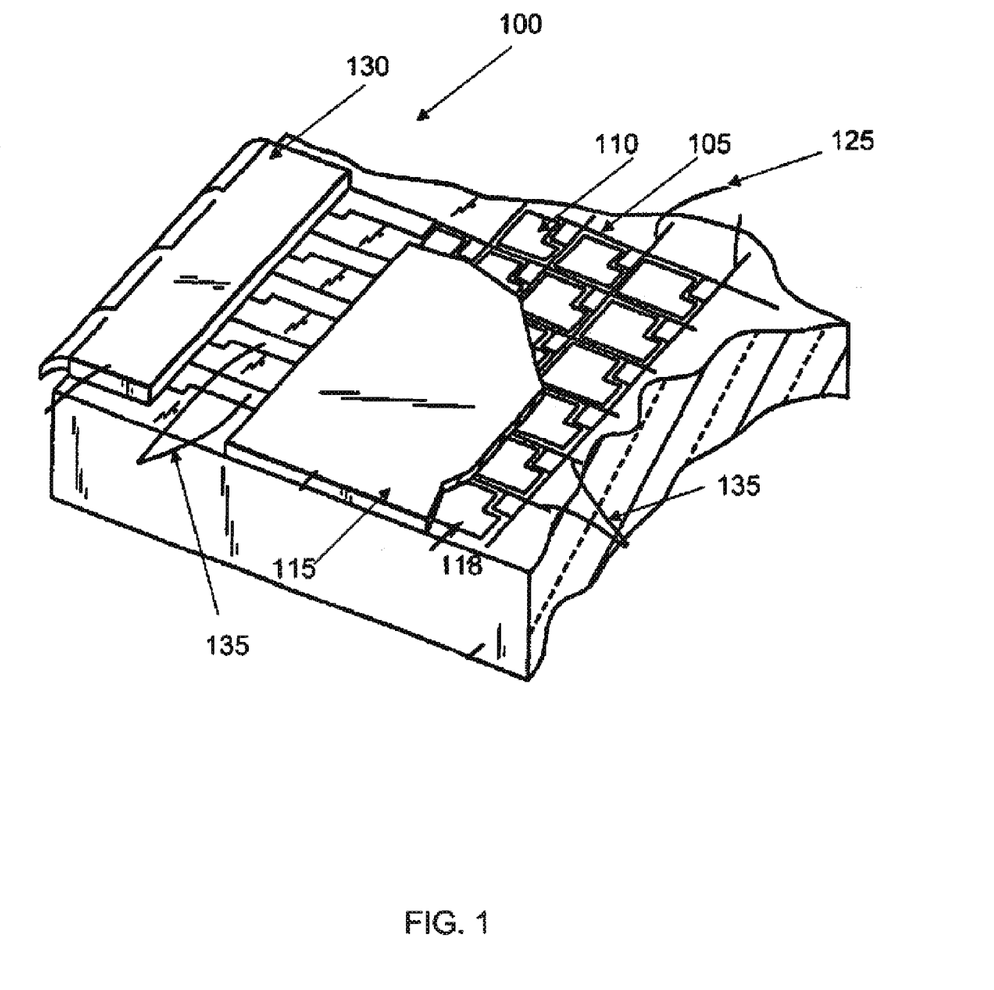
FIG. 1 is schematic view of a single flat panel X-ray detector capable of being used as a multi resolution detector as described in an embodiment of the invention.

FIG. 1 is diagrammatic illustration of a single flat-panel X-ray detector capable of being used as a multi resolution detector as described in an embodiment of the invention. The detector 100 has an array of detector elements 110, referred as detector array 105. In the detector array 105, the detector elements 110 are arranged in the form of rows and columns. Each detector element includes scintillator 115 and a photo sensor 118. The scintillator 115 converts X-ray energy into light energy. The photo sensor 118, in turn, is sensitive to the visible light energy. The detector array 105 further includes scan lines 125 and data lines 135 to read data from the detector array 105. A plurality of data lines 135 is provided for carrying the output signal of the detector elements 110. Scan lines 125 and data lines 135 are provided corresponding to each row and column. A scan electronics (not shown) is provided to activate the scan lines 125 and readout electronics 130 is provided to read data from the data lines 135. The output signal of each detector element 110 is an electrical signal, corresponding to the intensity of the x-ray image projected onto the detector elements 110. The array of detector elements 110 is connected to an X-ray imaging system by scan lines 125 and data lines 135 through scan electronics and readout electronics 130. The readout electronics 130 digitizes the signal read from the data line 130, and passes the digital data to a memory or processor. The detector 100 may be configured as a multi resolution detector by various techniques described in the following paragraphs.

Figure 2:
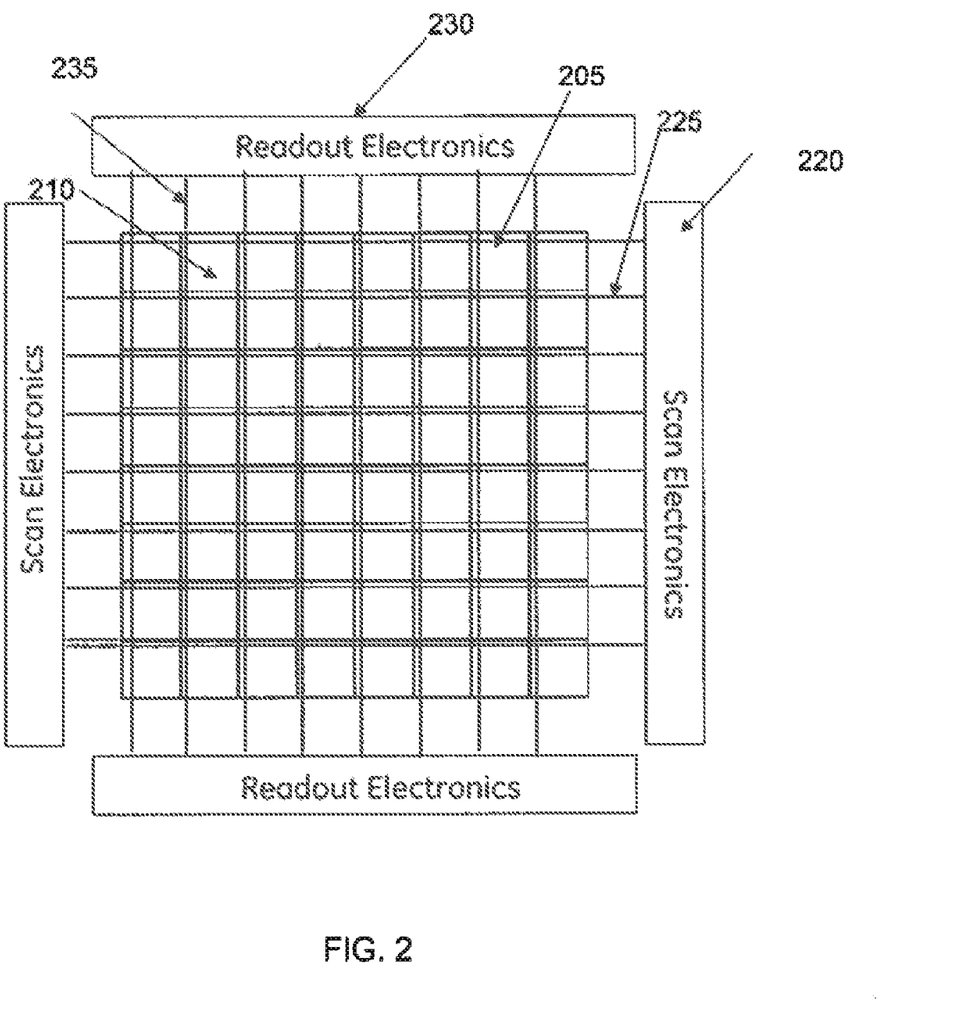
FIG. 2 is diagrammatic illustration of a detector capable of being used as a multi resolution detector as described in an embodiment of the invention.

FIG. 2 is diagrammatic illustration of a detector that is capable of being used as a multi resolution detector. The detector includes a detector array 205 associated with a scan electronics 220 and readout electronics 230. A plurality of detector elements 210 is arranged to form the detector array 205. The detector elements 210 may include photosensitive elements with an overlying scintillator. The detector array 205 comprises detector elements 210 organized in the form of rows and columns. The density or size of the detector elements 210 generally depends on the resolution requirement. In a high-resolution detector, density of the detector elements 210 i.e. the number of detector elements 210 present in a specific area will be greater. In the detector array 205, each row is provided with a scan line 225 and each column with a data line 235. The scan lines 225 are used to activate the detector elements 210 and the data lines 235 are used to carry signal from the detector elements 210. The scan lines 225 are actuated by the scan electronics 220 and signals conveyed by the data lines 235 are sensed by the readout electronics 230. In the detector shown, corresponding to each row or column, there is a scan line 225 or data line 235. Upon actuation of a scan line 225, one row is actuated and the signals from the actuated row are read by the readout electronics 230 through the data lines 235. These signals are digitized by the readout electronics 230 and stored. Thus the detector will act as a uniform resolution detector. However the uniform resolution detector may be configured to act as multi resolution detector by various techniques, as described in the following paragraphs.

In an embodiment, the detector may be manufactured as a multi resolution detector by fabricating the detector array 205, with variable density pixel zones defining high-resolution and coarse-resolution regions. Alternately, the detector array 205 may be fabricated to have uniform resolution, and the resolution may be adjusted by simultaneously driving different numbers of scan lines 225 and combining data from data lines 235. The scan lines 225 could be driven simultaneously by joining lines at the periphery of the array at the fabrication stage or by activation of multiple scan lines 225 during operation of the detector. Likewise the data lines could be joined at the fabrication stage or data from the data lines 235 may be combined at a later stage.

In an embodiment, the scan electronics 220 and readout electronics 230 can be configured to achieve multi resolution. The scan electronics 220 may combine activation of the scan lines or the readout electronics may combine data from data lines to achieve multi resolution Even though the scan and readout electronics are shown on both sides of the detector array, they may be attached to only one side of the detector array.

The various techniques by which a detector could be designed as a multi resolution detector are explained with reference to FIGS. 3-6.

Figure 3:
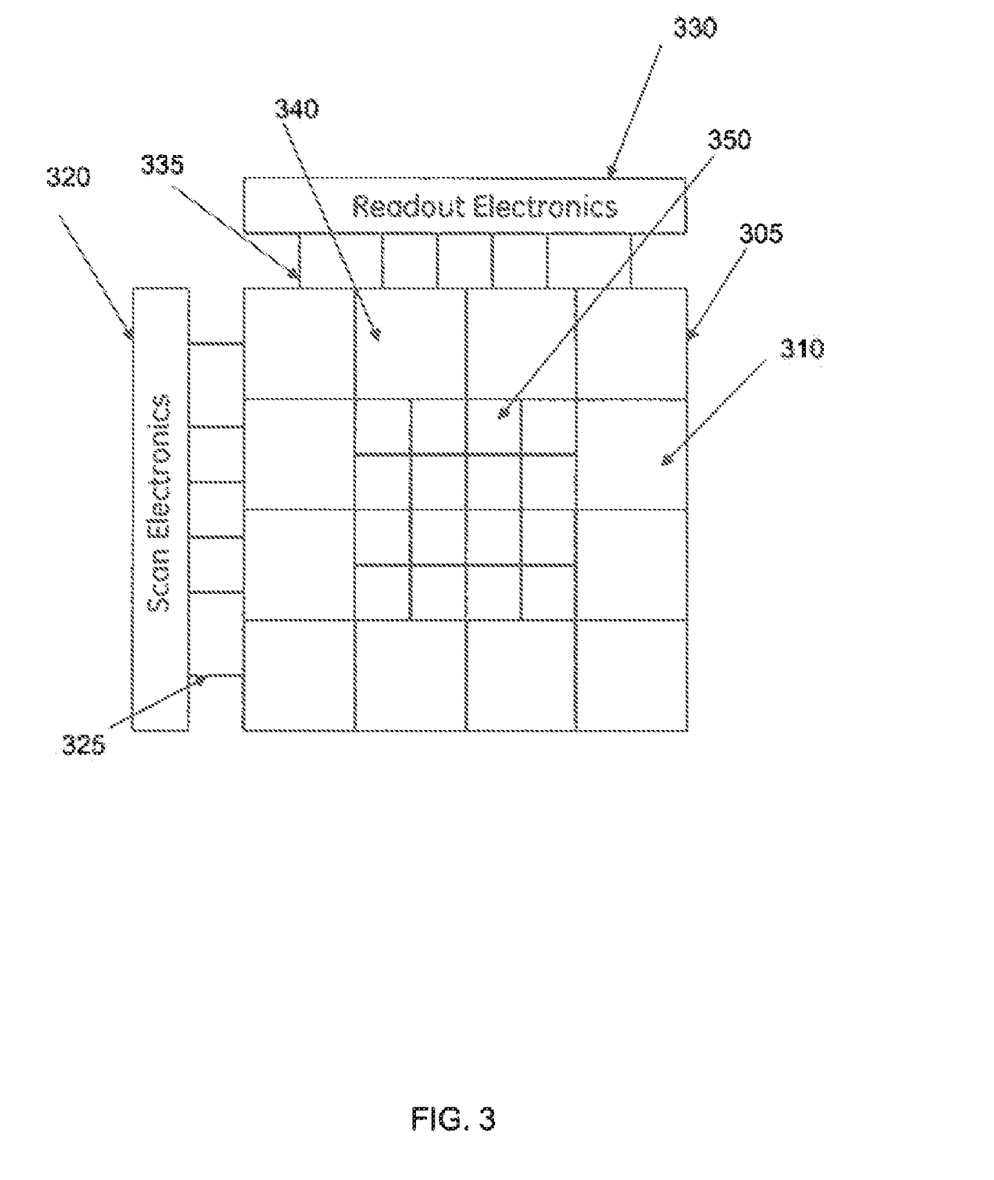
FIG. 3 is a diagrammatic illustration of a multi resolution detector as illustrated in an exemplary embodiment of the invention.

FIG. 3 is a diagrammatic illustration of a multi resolution detector as described in an exemplary embodiment of the invention. A multi resolution detector achieved through the design and fabrication of the detector array is illustrated. The detector includes a detector array 305 associated with scan electronics 320 and readout electronics 330. A plurality of detector elements 310 is arranged to form the detector array 305. The detector elements 310 may include photosensitive elements with an overlying scintillator. The detector array 305 comprises detector elements 310 organized in the form of rows and columns. In the detector array 305, each row is provided with a scan line 325 and each column with a data line 335.

In an embodiment, the detector is fabricated to have detector elements 310 at different densities in different parts of the detector array 305. The detector array 305 is fabricated to have a coarse-resolution region 340 and a high-resolution region 350. In the high-resolution region 350, the density of detector elements or pixel density is higher than in the coarse-resolution region 340. The coarse-resolution region 340 and the high-resolution region 350 can be located at any part of the detector. In an embodiment, shown in FIG. 3, the central part of the detector is the high-resolution region 350 and the borders are the coarse resolution regions 340. The resolution regions are fixed at the fabrication stage of the detector. The design is based on the clinical use of the detector. The resolution regions need not be symmetric. In an embodiment, there could be multiple high and coarse resolution regions. Also, there could be multiple different resolution regions, for example, high, medium, or low-resolution regions.

In an embodiment, the varying resolution regions are obtained by manufacturing the detector with different densities of detector elements 310 in different areas of the array, for example, providing a high density of detector elements in a high-resolution region and providing a low density of detector elements in a coarse-resolution region. The high- and coarse-resolution regions may have detector elements with different sizes and shapes. Furthermore, the properties of the overlying scintillator may be different in the different regions. However, the scan electronics and the readout electronics may be retained as the ones in the conventional detector.

Figure 4:
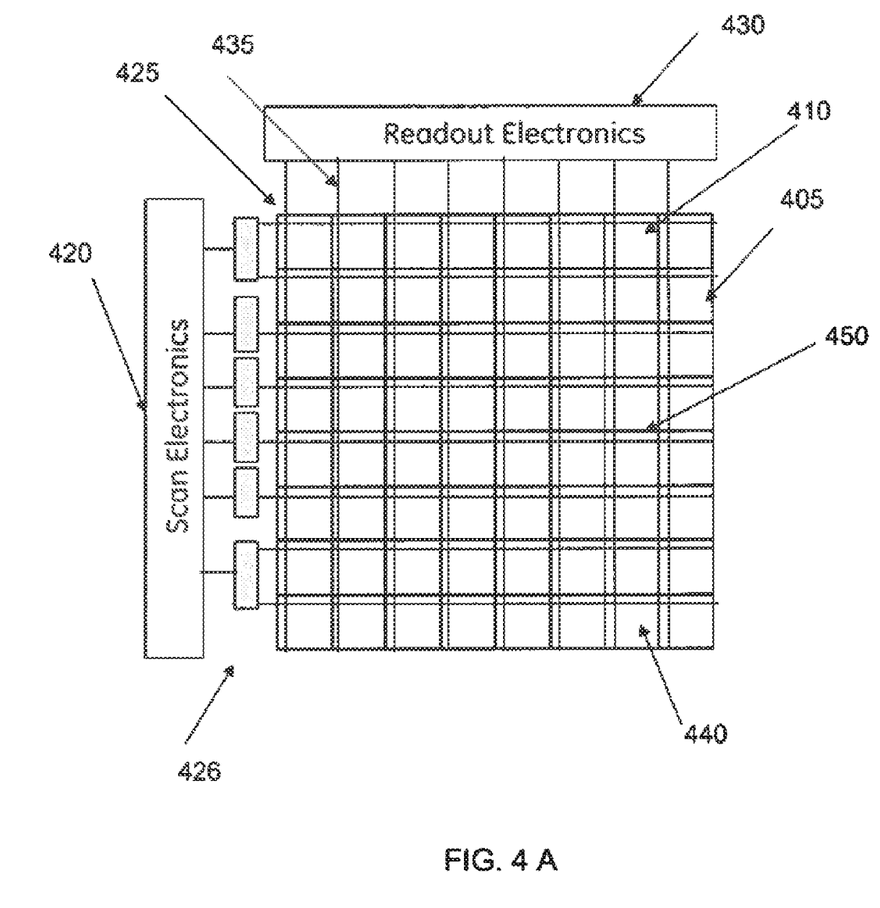
FIGS. 4A and 4B are diagrammatic illustrations of a multi resolution detector achieved by driving multiple scan lines simultaneously and combining data from data lines, respectively, as illustrated in an exemplary embodiment of the invention.
Figure 4B:
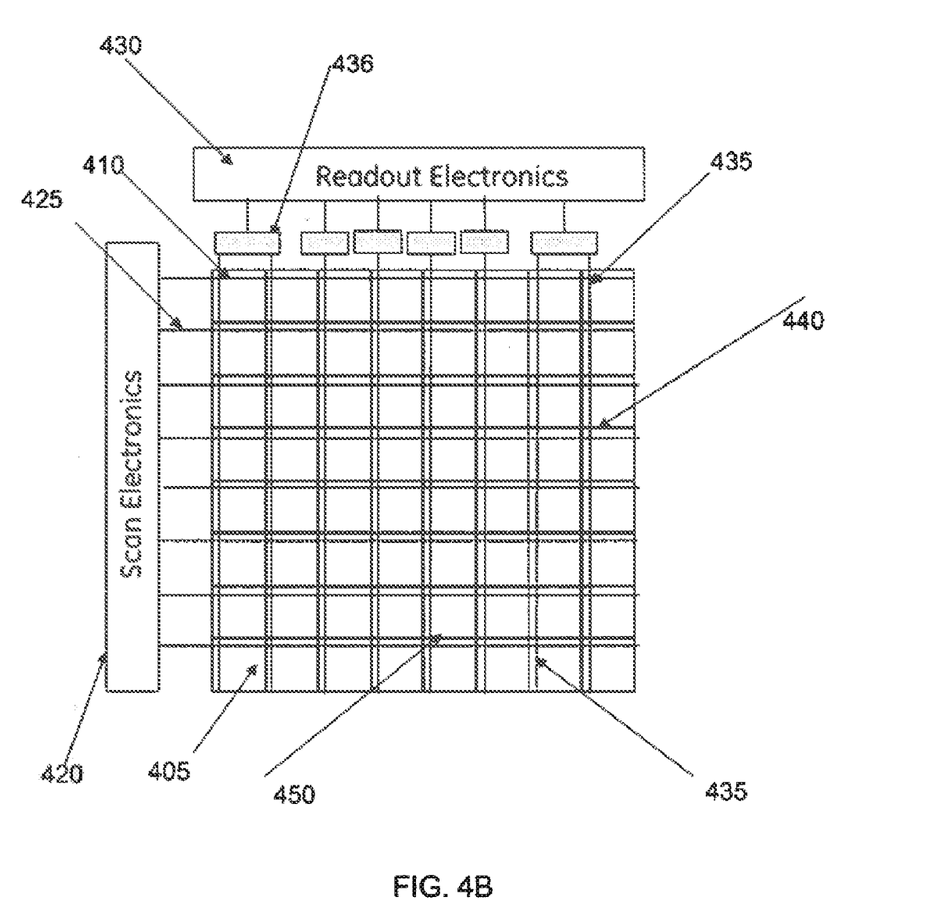

FIGS. 4A and 4B are diagrammatic illustrations of multi resolution detectors achieved by combining activation of scan lines (driving multiple scan lines simultaneously) and combining data from the data lines, respectively, as illustrated in an exemplary embodiment of the invention. In an embodiment, scan lines at certain part of detector array are combined to achieve multi resolution. Alternately, data from data lines are combined to achieve variable resolution. The detector includes a detector array 405 associated with scan electronics 420 and readout electronics 430. A plurality of detector elements 410 is arranged to form the detector array 405. The detector elements 410 may include photosensitive elements with an overlying scintillator. The detector array 405 comprises detector elements 410 organized in the form of rows and columns.

FIG. 4A illustrates achieving multi resolution by combining adjacent scan lines at the edge of the panel. Conventionally, corresponding to each row in the detector array 410 there is a scan line 425. The scan line 425 is activated to obtain data from the corresponding row. In an embodiment, adjacent scan lines 425 could be joined together at the edge of the panel to obtain a region with reduced resolution. In an example, the detector may have a high-resolution area 450 and a coarse-resolution area 440. The high-resolution area 450 may be defined by having the scan line for every row connected to a separate scan line driver 426, at the edge of the panel. The coarse-resolution area 440 may be formed by joining together adjacent scan lines at the edge of the panel and connecting each joined line to a scan line driver 426. In an example, the high-resolution area 450 may be provided with scan line drivers 426 as normal i.e. one scan line driver 426 corresponding to each scan line 425. However, in the coarse-resolution area 440, the scan lines 425 could be joined together at the edge of the panel so that one scan line driver 426 is connected to two scan lines 425. Thus the distribution of the scan line drivers 426 need not be uniform. Based on the clinical need, the scan lines 425 can be combined. In an embodiment, the scan lines 425 are combined at the fabrication stage. The scan electronics 420 and the readout electronics 430 could be constructed as the ones similar to a conventional detector or could be constructed to have fewer scan drivers and readout channels where there are fewer connections at the edge of the panel.

Thus, while activating the scan lines 425 and reading the data lines 435, the resolution obtained from the region where the activation of scan lines is combined will be less than that from an area having uncombined activation of scan lines 425. The combination means could be done at the fabrication stage based on the resolution requirement.

In an embodiment shown in FIG. 4B, the multi resolution is achieved by combining data lines. Conventionally, corresponding to each column in the detector array 410 there is a data line 435. The data line 435 conveys signals from the detector elements 405 on the corresponding column. In an embodiment, the signals from adjacent data lines 435 could be combined to obtain a coarse-resolution region. In an example, the detector may have a high-resolution area 450 and a coarse-resolution area 440. The high-resolution area 450 may be defined by having the signals from each data line 435 separately sensed and converted to digital values. The coarse-resolution area 440 may be defined by combining the signals from adjacent data lines 435. In an example, the high-resolution area 450 may sense and digitize signal conveyed by data line 435 as normal i.e. the signal from each data line 435 is sensed and converted to a digital value. However, the coarse-resolution area 440 may combine data; for example, signals from two adjacent data lines 435 may be combined. Thus the distribution of the readout electronics channels 436 need not be uniform. Based on the clinical need, the signals from adjacent data lines 435 can be combined. In an embodiment, the adjacent data lines 435 can be joined together at the edge of the panel at the fabrication stage. However the scan electronics 420 and the readout electronics 430 could be constructed as the ones similar to a conventional detector. Thus the area where data is combined will act as coarse-resolution region 440 and area where the data has been sensed and digitized normally will act as high-resolution region 450. The distribution of readout electronics channels 436 could be done at the fabrication stage based on the resolution requirement In an embodiment, the detector may be configured to have a coarse-resolution region 440 and a high-resolution region 450 by combining activation of the scan lines 425 or combining data from the data lines 435.

Figure 5:
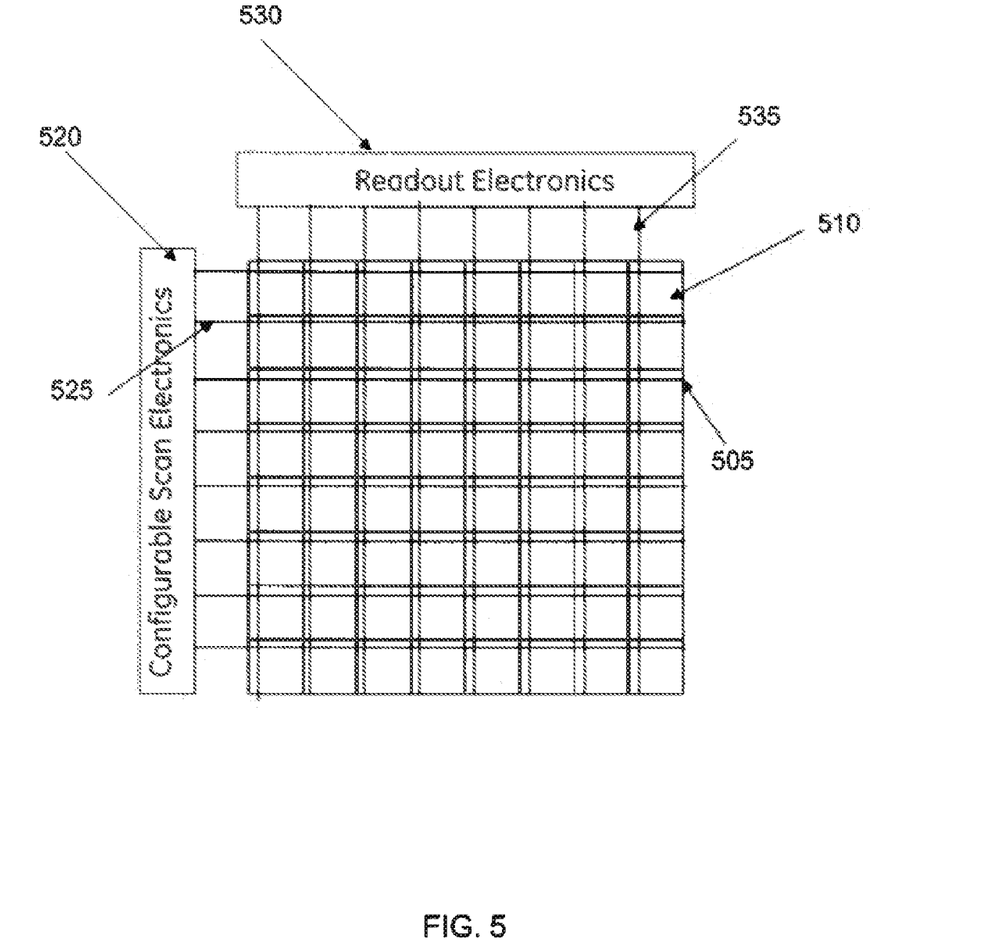
FIG. 5 is a diagrammatic illustration of a multi resolution detector having configurable scan electronics, as illustrated in an exemplary embodiment of the invention.

FIG. 5 is a diagrammatic illustration of a multi-resolution detector having configurable scan electronics as illustrated in an exemplary embodiment of the invention. In an embodiment shown, the multi resolution detector is designed to have configurable scan electronics 520. The detector includes a detector array 505 associated with the scan electronics 520 and readout electronics 530. A plurality of detector elements 510 is arranged to form the detector array 505. The detector elements 510 may include photosensitive elements with an overlying scintillator. The detector array 505 comprises detector elements 510 arranged in the form of rows and columns, each row has a scan line 525, and each column has a data line 535.

The detector may be fabricated in a conventional manner having uniform detector element density and uniformly distributed scan electronics 520 and readout electronics 530. The multi resolution is achieved by providing configurable scan electronics 520. The configurable scan electronics 520 simultaneously activates the number of scan lines 525 required to achieve the desired resolution in a particular region. For example, adjacent scan lines may be activated at the same time instead of activating all the scan lines individually. This will result in a coarse-resolution image data. The scan electronics 520 is programmable and could be programmed based on the resolution requirement. Thus by configuring the scan electronics 520, a high-resolution detector, or certain parts of the detector, may be configured as a low-resolution detector.

The scan electronics 520 could be configured in real time. In an embodiment, a clinician may program the scan electronics 520 based on the resolution requirement in real time.

Figure 6:
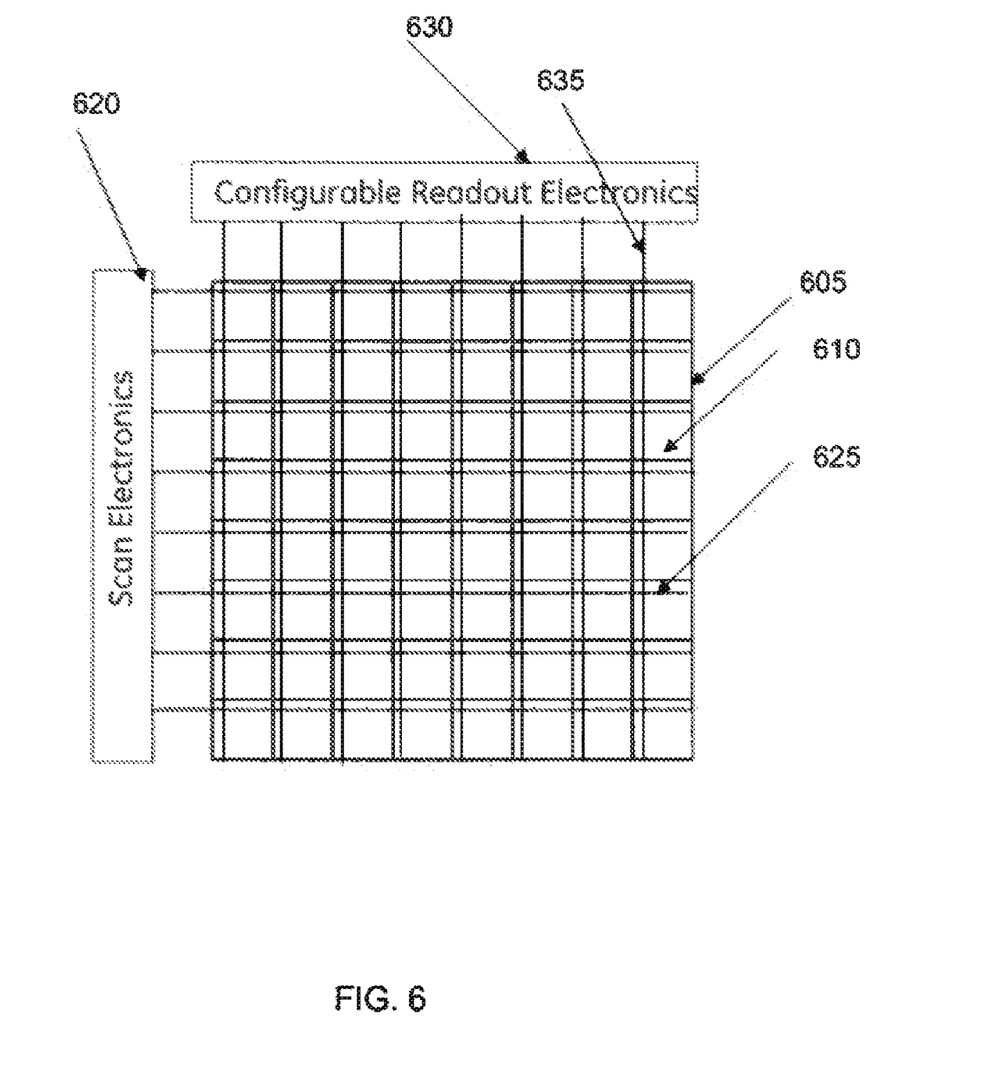
FIG. 6 is a diagrammatic illustration of a multi resolution detector having configurable readout electronics, as illustrated in an exemplary embodiment of the invention.

FIG. 6 is a diagrammatic illustration of a multi resolution detector having configurable readout electronics as illustrated in an exemplary embodiment of the invention. In an embodiment shown, the multi resolution detector is designed to have configurable readout electronics. The detector includes a detector array 605 associated with a scan electronics 620 and readout electronics 630. A plurality of detector elements 610 is organized to form the detector array 605. The detector elements 610 may include photosensitive elements with an overlying scintillator. The detector array 605 comprises detector elements 610 arranged in the form of rows and columns, each row has a scan line 625 and each column has a data line 635.

The detector may be fabricated in a conventional manner having uniform detector element density and uniformly distributed scan and readout electronics. The multi resolution is achieved by providing configurable readout electronics 630. The configurable readout electronics 630, combines signals or digitized data from adjacent data lines 635 while reading the same, based on the resolution requirement. For example, signals or data from adjacent data lines 635 may be combined instead of producing separate data values for each data line. This will result in coarse-resolution image data. The readout electronics 630 is programmable and could be programmed based on the resolution requirement. Thus by configuring the readout electronics 630, a high-resolution detector, or certain parts of the detector, may be configured as a low-resolution detector.

The readout electronics 630 could be configured in real time. In an embodiment, a clinician may program the readout electronics 630 based on the resolution requirement in real time.

Figure 7:
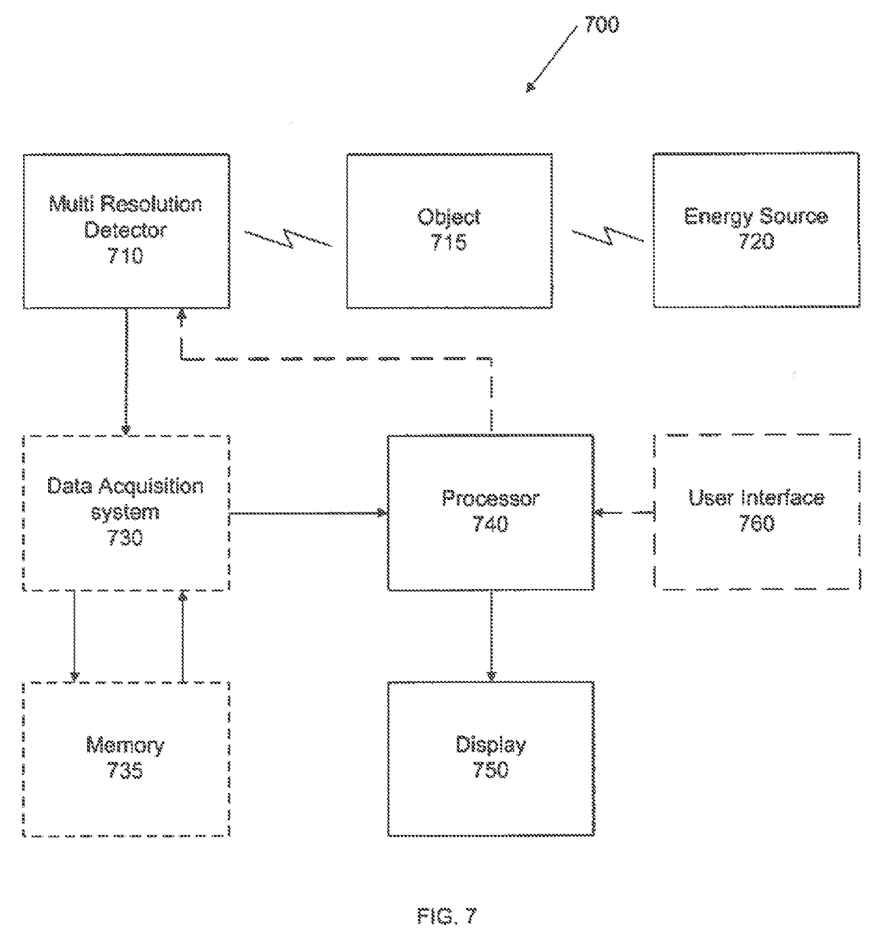
FIG. 7 is a block diagram of an imaging system using a multi resolution detector as described in an embodiment of the invention.

FIG. 7 is a block diagram of an imaging system using a multi resolution detector as described in an embodiment of the invention. In an embodiment, the imaging system 700 uses a single flat panel photosensitive multi resolution X-ray detector 710. In the imaging system 700, an X-ray energy source 720 emits X-ray energy at a desired region of interest of an object 725. In an embodiment, the X-ray source is stationary. The X-ray energy passing through the object 725 is acquired by the multi resolution detector 710. The multi resolution detector 710 may be configured in different ways to achieve multi resolution. The electrical signals produced by the photosensitive multi-resolution detector 710 are converted to corresponding digital data and sent to a data acquisition system 730 where they are optionally stored in digital form in a memory 735. However in an exemplary embodiment, the read out electronics could act as a data acquisition system. The digital values may then be sent from the memory 735 in the data acquisition system 730 to a processor 740 for performing a series of steps to process an image of the object 715. The processed image may then be sent to a display 750, which displays the image of the object 715 on a screen. Alternately, the image may be sent to a printer (not shown) for printing a copy of the image from either the processor 740 or the display 750. The processor 740 may also send the reconstructed image to a computer (not shown) for further processing and subsequent display. Alternatively, the digital values may be sent directly from the memory 735 in the data acquisition system 730 to the computer for reconstruction of an image. The reconstructed image is then sent from the computer to the display 750 for displaying. The memory may include, for example, random access memory (RAM), flash memory, or read-only memory. For purposes of simplicity, devices that can read and/or write media on which computer programs are recorded are also included within the scope of the term "memory."

In an embodiment, the detector 710 has a detector array fabricated to achieve multi resolution. The detector array may be fabricated to have a high-resolution region and a coarse-resolution region. This could be achieved by fabricating detector elements with different densities in different parts of the detector array. The data from these regions are provided to the data acquisition system 730 and will be varying in resolution. The processor 740 may generate a variable resolution image based on the structure of the detector array.

In an embodiment, the detector 710 is fabricated to have a high-resolution region and a coarse-resolution region by driving multiple scan lines at the same time and combining signals from multiple data lines. The detector is fabricated with scan lines and data lines joined at the edge of the panel in some regions, based on the resolution requirement. Thus the data acquired will have varying resolution and the processor 740 may generate a multi resolution image.

In an embodiment, the processor 740 is programmed to configure scan electronics in the detector 710 to obtain a multi resolution image. The scan electronics drives one or more scan lines simultaneously based on the resolution requirement and variable resolution image data is acquired by the data acquisition system 730.

In an embodiment, the processor 740 is programmed to configure readout electronics in the detector 710 to obtain a multi resolution image. The readout electronics combines the signals or data from one or more data lines based on the resolution requirement and variable-resolution image data is acquired by the data acquisition system 730.

The scan electronics and readout electronics are hardware components. They may be controlled by hardware and/or software. Thus, "electronics" may also refer to hardware or a combination of hardware and software performing a function.

Dedicated hardware may be used instead of software and/or firmware for performing image processing, or a combination of dedicated hardware and software, or software in combination with a general-purpose processor, or a digital signal processor may be used. Once the requirements for such software and/or hardware and/or dedicated hardware are gained from an understanding of the descriptions of embodiments of the invention contained herein, the choice of any particular implementation may be left to a hardware engineer and/or software engineer. However, any dedicated and/or special purpose hardware or special purpose processor is considered subsumed in the block labeled processor 740.

In an embodiment, different parts of the image can have different resolution.

In an embodiment, the processor 740 is further programmed to configure the multi resolution detector as a uniform resolution detector. This is done by configuring the scan electronics and readout electronics to drive individual scan line and to sense and convert signal from individual data lines.

In an embodiment a user interface 760 is provided in association with the processor 740 to provide the resolution requirement. The user may enter the resolution requirements while imaging and based on the user input the processor 740 may configure the scan electronics or readout electronics to achieve a desired image resolution. The user interface may include, for example, a mouse, a touch screen and stylus, a keyboard with cursor keys, or combinations thereof.

Thus various embodiments of the invention provide a multi resolution flat panel X-ray detector. In some embodiments, the existing flat panel detector may be converted to multi resolution detector by programming the scan electronics and the readout electronics. Alternately, the detector elements and/or data or scan lines may be configured at the fabrication stage to act as a multi resolution detector.

In yet other embodiments of the present invention, a machine readable medium or media may include, but not be limited to, magnetic disks and diskettes, optical disks and diskettes, and/or ROM, flash ROM, and/or battery backed RAM, or any other suitable magnetic, optical, or electronic medium or media). A non-exhaustive list of media that can be read with such a suitable device includes CDs, CD-RWs, DVDs of all types, magnetic media (including floppy disks, tape, and hard drives), flash memory in the form of sticks, cards, and other forms, ROMs, etc., and combinations thereof. The medium (or media) has recorded thereon instructions configured to instruct an imaging system 700 that includes a detector 710, data acquisition system 730, a computer or processor 740, memory 735, and a display 750. The instructions include instructions for routine for configuring at least one of scan electronics and readout electronics in the flat panel detector for achieving a desired resolution. The instruction for configuring the scan electronics includes driving multiple scan lines simultaneously and the instruction for configuring the readout electronics includes combining data from data lines in the detector.

The method and system disclosed herein have the technical advantage of providing multi resolution detector. It will thus be appreciated that embodiments of the present invention provide a multi resolution flat panel detector. Embodiments of the present invention are particularly useful in providing variable resolution functionality for different diagnostic applications.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The advantages of the invention include providing flexibility with a single flat panel detector. One detector can be high resolution for certain smaller areas of anatomy and also flexible to cover large field of view with a lower resolution. It provides a cost effective solution for obtaining multi resolution, avoiding the use of multiple detectors to obtained multi resolution.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

We claim:

1. A multi resolution flat panel X-ray detector comprising:
a detector array having a plurality of rows and columns of detector elements;
scan electronics designed to activate the detector array for reading data from the detector array; and
readout electronics associated with the scan electronics to read the data from the detector elements;
wherein at least one of the detector array, scan electronics and readout electronics is physically configured to achieve multi resolution;
wherein either the scan electronics include a plurality of scan drivers non-uniformly coupled to scan lines or the readout electronics include a plurality of readout electronics channels non-uniformly coupled to data lines, or both.

2. The detector as claimed in claim 1, wherein the scan electronics is configured to drive multiple scan lines simultaneously based on the resolution requirement.

3. The detector as claimed in claim 1, wherein the readout electronics is configured to combine data from the data elements based on the resolution requirement.

4. The detector as claimed in claim 1, wherein the scan electronics and the readout electronics are configured in real time.

5. The detector as claimed in claim 1, wherein at least one scan driver is coupled to no more than one scan line and at least one other scan driver is coupled to a plurality of scan lines.

6. The detector as claimed in claim 5, wherein the scan drivers coupled to a plurality of scan lines are adjacent to a corner of the detector array.

7. The detector as claimed in claim 6, wherein a high-resolution region and coarse-resolution region are formed based on the configuration of the scan drivers and scan lines.

8. The detector as claimed in claim 1, wherein at least one readout electronics channel is coupled to no more than one data line and at least one other readout electronics channel is coupled to a plurality of data lines.

9. The detector as claimed in claim 8, wherein readout electronics channels coupled to a plurality of data lines are adjacent to a corner of the detector array.

10. The detector as claimed in claim 9, wherein a high-resolution region and coarse-resolution region are formed based on the configuration of the readout electronics channels and data lines.

11. An X-ray imaging system comprising:
a flat panel multi resolution detector having at least one of a multi resolution detector array, scan electronics physically configured to achieve multi-resolution, and readout electronics physically configured to achieve multi-resolution, wherein either the scan electronics include a plurality of scan drivers non-uniformly coupled to scan lines or the readout electronics include a plurality of readout electronics channels non-uniformly coupled to data lines, or both;

a stationary energy source configured to apply radiation to a region of interest of an object;

a data acquisition system for acquiring multi resolution image data from the detector; and a processor for generating a multi resolution image from the multi resolution image data.

12. The system as claimed in claim 11, wherein the multi resolution detector array includes at least one high-resolution region and one coarse-resolution region, the resolution being defined based on the physical configuration of the scan lines and scan drivers and the data lines and readout electronics channels.

13. The system as claimed in claim 12, wherein the high-resolution region and the coarse-resolution region are configured with reference to at least one parameter.

14. The system as claimed in claim 13, wherein the parameters include size and shape of pixel, and properties of scintillator.

15. The system as claimed in claim 13, wherein the processor is further programmed to configure at least one of the scan electronics and the readout electronics for obtaining the multi resolution image.

16. The system as claimed in claim 11, wherein the processor is configured to combine activation of the scan lines or combine data from data lines for obtaining a desired resolution.

17. The system as claimed in claim 11, wherein the scan electronics is configured to drive multiple scan lines simultaneously based on the resolution requirement.

18. The system as claimed in claim 11, wherein the readout electronics is configured to combine data from the data lines based on the resolution requirement.

19. The system as claimed in claim 11, wherein at least one scan driver is coupled to no more than one scan line and at least one other scan driver is coupled to a plurality of scan lines.

20. The detector as claimed in claim 19, wherein the scan drivers coupled to a plurality of scan lines are adjacent to an edge of the detector array.

21. The detector as claimed in claim 20, wherein a high-resolution region and coarse-resolution region are formed based on the configuration of the scan electronics and scan lines.

22. The system as claimed in claim 11, wherein at least one readout electronics channel is coupled to no more than one data line and at least one other readout electronics channel is coupled to a plurality of data lines.

23. The detector as claimed in claim 22, wherein the readout electronics channels coupled to a plurality of data lines are adjacent to an edge of the detector array.

24. The detector as claimed in claim 23, wherein a high-resolution region and coarse-resolution region are formed based on the configuration of the readout electronics channels and data lines.

25. The system as claimed in claim 11, wherein the scan electronics and the readout electronics are configured in real time.

26. A method of providing a multi resolution single panel X-ray detector comprising:

adjusting resolution of the X-ray detector by performing at least one of the following steps:

providing a detector array with a configurable scan electronics physically configured to simultaneously drive one or more scan lines in the detector array, based on the resolution requirement, wherein the scan lines are non-uniformly coupled to a plurality of scan drivers; and providing a detector array with a configurable readout electronics physically configured to combine data from data lines in the detector array based on the resolution requirement, wherein the data lines are non-uniformly coupled to a plurality of readout electronics channels.

27. The method as claimed in claim 26, wherein the step of providing a detector array with a coarse-resolution region and a high-resolution region comprises: providing pixel zones differing in at least one of size of pixel, shape of pixel, and scintillator properties.

28. The method as claimed in claim 26, wherein at least one scan driver is coupled to no more than one scan line and at least one other scan driver is coupled to a plurality of scan lines.

29. The method as claimed in claim 28, wherein the scan drivers coupled to a plurality of scan lines are adjacent to an edge of the detector array.

30. The method as claimed in claim 29, wherein a high-resolution region and coarse-resolution region are formed based on the configuration of the scan electronics and scan lines.

31. The method as claimed in claim 26, wherein at least one readout electronics channel is coupled to no more than one data line and at least one other readout electronics channel is coupled to a plurality of data lines.

32. The method as claimed in claim 31, wherein the readout electronics channels coupled to a plurality of data lines are adjacent to a corner of the detector array.

33. The method as claimed in claim 32, wherein a high-resolution region and coarse-resolution region are formed based on the configuration of the readout electronics channels and data lines.

* * * * *